T. I. DUFFY.
DEMOUNTABLE WHEEL.
APPLICATION FILED MAY 2, 1910.
1,125,498.
Patented Jan. 19, 1915.
2 SHEETS—SHEET 2.
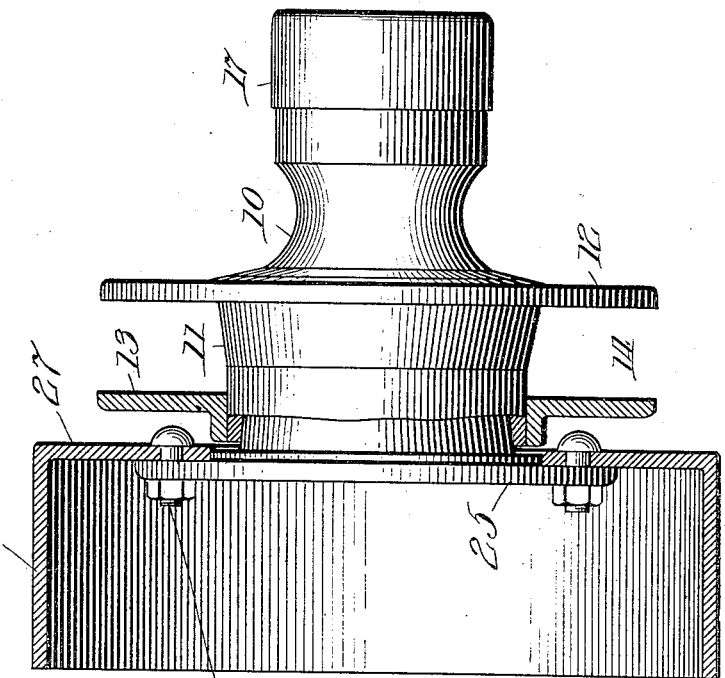
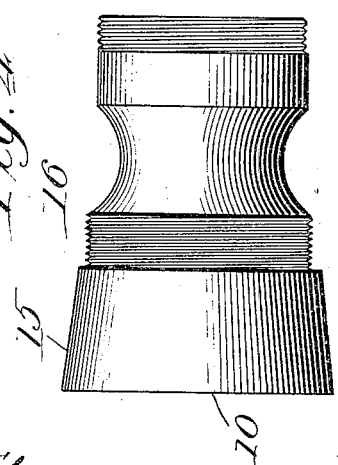
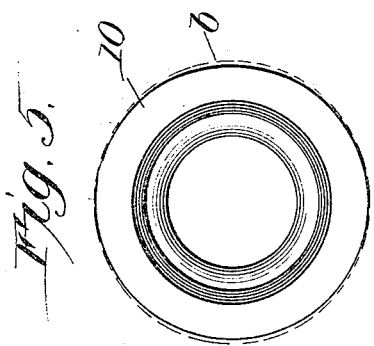
Witnesses:
Harry S. Gaither
William Goldberger
Inventor:
Thomas I. Duffy
by William L. Hall
Atty

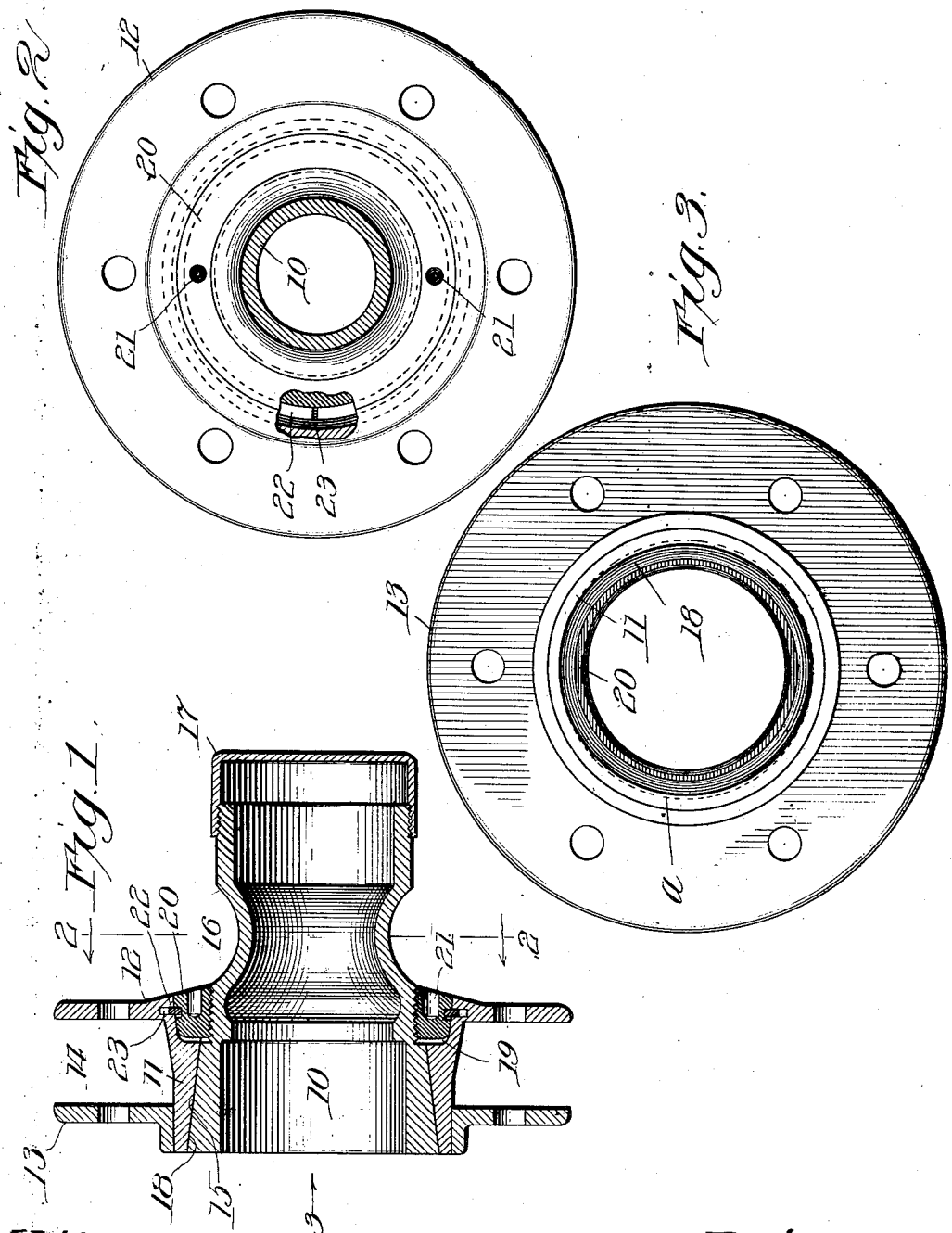

UNITED STATES PATENT OFFICE.

THOMAS I. DUFFY, OF CHICAGO, ILLINOIS, ASSIGNOR TO HENRY ELLSWORTH AND ALBERT E. CROSS, COPARTNERS AS FIRM ELLSWORTH & CROSS, OF CHICAGO, ILLINOIS.

DEMOUNTABLE WHEEL.

1,125,498.     Specification of Letters Patent.     Patented Jan. 19, 1915.

Application filed May 2, 1910. Serial No. 558,807.

*To all whom it may concern:*

Be it known that I, THOMAS I. DUFFY, a citizen of the United States, and a resident of Chicago, in the county of Cook and State of Illinois, have invented certain new and useful Improvements in Demountable Wheels; and I do hereby declare that the following is a full, clear, and exact description thereof, reference being had to the accompanying drawings, and to the characters of reference marked thereon, which form a part of this specification.

This invention relates to hubs for demountable wheels and refers more specifically to an improved construction in that kind of hubs comprising separately formed hub members one of which carries the spokes and the rim of the wheel and is adapted to be removably fitted to the other member in such a way as to permit the principal part of the wheel to be removed and replaced by another part wheel when occasion requires.

My improvements have been especially designed for use in connection with demountable vehicle wheels, such as automobile wheels, which are provided with pneumatic tires; and the arrangement is such that when it becomes necessary to remove and replace a worn or injured tire, the demountable portion of the wheel is removed and is replaced by another part wheel to which is fitted a perfect tire, thus avoiding the immediate necessity of repairing the injured tire and fitting it to the wheel.

Among the objects of the invention is to provide improvements in hubs for demountable wheels so constructed and arranged as to afford an interlocking connection between the two hub members to prevent relative rotation, without the necessity of using keys and key-ways, or interlocking lugs and recesses on the engaging parts of the hub members, and an arrangement which permits the hub members to be easily constructed and readily separated when the wheel is to be demounted and to be readily assembled when the wheel is to be replaced.

A further object of the invention is to provide interlocking or non-rotative connection between the two hub members, so constructed and arranged with respect to the means, as screw-threaded locking means, which force the members together, as to take up all wear which may occur between the contacting surfaces of the members and to compensate for any inaccuracies of fit which may occur in the manufacture of the parts so that said hub members may at all times be accurately and positively maintained in their intended locked engagement.

A further object of the invention is to provide a construction of a demountable wheel hub of this character by which the size and appearance of the hub is altered to a minimum extent, whereby my improvements may be adapted to standard hubs and bearings, without any change whatsoever in the bearings, and without sacrificing the individuality or design of the hub. In this connection, I have provided a locking means for forcing and holding the hub members together which is arranged to be housed within the solid part of the hub so as not to affect the appearance of design of the hub. The said locking means is also inclosed or housed within a solid or substantial part of the hub and at a point distant from the end of the hub so as to avoid liability of this part of the device becoming deranged by contact with external objects.

My invention also comprehends an improved means for connecting the locking means to the hub member whereby when the screw-threaded locking means are turned in one direction, the hub members are forced together and when turned in the other direction they are separated.

A further object of the invention is to provide means for automatically maintaining the locking means tightened without the use of separately applied locking devices.

In the drawing is shown one practical and approved form of construction embodying the several features of my invention. The details thereof and the particular use to which the construction may be applied are however capable of variation without departure from the spirit and scope of the invention, and without sacrificing the advantages of the illustrated construction.

As shown in said drawings, Figure 1 is an axial section of a hub embodying my invention. Fig. 2 is a cross section on the line 2—2 of Fig. 1. Fig. 3 is a rear elevation of the outer member of the hub. Fig. 4 is a side elevation of the inner member of the hub. Fig. 5 is a rear elevation of said inner member. Fig. 6 is a view partially in elevation and partially in section of a hub, showing means for applying a brake drum thereto.

The hub comprises as its principal elements an inner member 10 and an outer tubular member 11 fitted thereover. The inner member is interiorly fashioned to receive the bearing shell of the hub (not shown). The outer member is provided with an integral flange 12, between which and a slip flange 13, fitted over the outer member, is formed an annular groove 14 to receive the spoke tenons of the wheel (not shown). The rear end of the inner member is formed with an exterior taper 15, said inner member being made largest at its rear end. Said inner member is provided in front of the exteriorly tapered portion with an exterior screw thread 16, and is provided at its extreme outer end with an exterior screw thread to afford means for removably attaching a dust cap 17 to the hub.

The outer member 11 of the hub is formed with an interior tapered or cone-like surface 18 complemental to and adapted to interfit with the exterior tapered or cone-like surface 15 of the inner member. The said outer member is interiorly cut away or enlarged to provide at its front end a forwardly opening, annular recess 19 to receive an interiorly screw-threaded locking ring 20 that is adapted to engage the screw thread 16 of the inner hub member to lock the members together. The locking ring is provided with spanner holes 21 adapted to receive the arms of a spanner wrench by which the ring is turned or rotated. Said locking ring when turned into place reacts on the hub members in a manner to force or wedge the complemental tapered surfaces tightly together, and interlocking means may be provided at said tapered surfaces, as will hereinafter be described, for holding said members from relative rotation. The said screw-threaded locking ring is retained in the recess 19 by means permitting it to rotate freely therein, but holding it from lateral movement with respect to the outer hub member. By reason of the interlocking connection between the locking ring and the outer member of the hub, when said locking ring is turned off the inner hub member to release the hub members, the said members are shifted endwise relatively to each other to separate the wedging or inclined surfaces thereof.

The means herein shown for retaining the locking ring in the recessed outer hub member consists of a split retaining ring 22 that is contained partially in an annular groove 23 in the outer member and a registering annular groove in the circumference of the locking ring 20, as clearly indicated in Figs. 1 and 2. The said split ring is formed to naturally spring into and fit closely the bottom wall of the groove in the locking ring. The parts are assembled by first contracting the split ring and inserting it into the recess 19 until it is brought into line with the groove 23 and releasing it to allow it to spring partially into said groove. Thereafter, when the locking ring 20 is forced into place and into the split ring it spreads the latter ring and when the groove in the locking ring is brought into line with the split ring said ring springs into the position shown in Figs. 1 and 2. The locking ring 20 is tapered inwardly, it being made of smallest diameter at its inner end, and the outer wall of the annular recess or groove 19 is complementally tapered for engagement with the taper of the ring. In this manner a dust proof joint is formed between the ring and the outer member when the ring is tightened. The groove of said ring which receives the split retaining ring is made slightly wider than the thickness of the ring so as to permit the tapered surface of the ring to adjust itself on the outer member when the ring is tightened.

The tapered or cone-like complemental portions 15 and 18 of the inner and outer hub members, respectively, are varied in cross section from a true circle so that when said tapered parts are wedged together through the action of the locking ring 20, an interlocking connection is afforded which locks said members against relative rotation. In the present construction, such interlocking effect is obtained by making the tapering portions of the members slightly oval in cross section, as will be apparent from the application of the dotted circles $a$ and $b$ to Figs. 3 and 5, which indicates the divergence of the cross section of the tapered portions from a true circle. Other complemental cross sections may be relied upon to produce such non-rotative interlocking effect.

In assembling the hub the outer member is slipped over the smaller end of the inner member until the locking ring is engaged with the screw thread 16. Thereafter the locking ring is screwed over said screw-thread to force the outer member over the inner member and wedge the tapered surfaces of said members together. In this position of the parts the two interlocked members of the hub form in effect a solid hub having substantially the strength and durability of a solid hub.

In the use of a wheel provided with my improved hub, when it is desired to substitute a part wheel with a perfect tire for a part wheel having an injured or worn tire, the locking ring 20 is unscrewed to release the inner hub member from the outer member. By reason of the interlocking connection of the said locking ring with the outer hub member when said locking ring is unscrewed, it forces the outer member outwardly off the inner member, thereby automatically separating the wedge or tapered surfaces of the inner and outer hub members and permitting the removal of said outer hub member and the part wheel carried thereby without resorting to additional means for driving or forcing the hub members apart. When the outer member of the hub and the part wheel carried thereby are thus removed, a duplicate part wheel, with a perfect tire is substituted and is locked to the inner hub member in the manner before described. In this manner the replacement of a worn or injured tire may be readily accomplished with the expenditure of but little time.

In Fig. 6 I have shown means for attaching a brake drum 24 to a hub made in accordance with my invention, as for instance the hub of the rear or driving wheel of a motor driven vehicle. This may be accomplished by forming on the rear end of the inner member a radial, annular flange 25, arranged parallel to the slip flange 13, and the brake drum is attached to said flange 25 by the bolts 26 which extend through the flange 25 and the flange 27 of the said brake drum.

An advantage of the oval, or other complemental, cross section of the engaging tapered portions of the inner and outer hub members, whereby to effect an interlocking of said members together to prevent relative rotation thereof, is that such interlocking connection is afforded without the necessity of grooving the parts, as would be necessary in the use of a key or spline. I am enabled, therefore, to save the machine operation necessary in making key ways, and thereby materially economize the time and labor required to construct the parts. The interfitting, interlocking parts on the complemental tapered portions of the hub members are, therefore, integral parts of said members. Moreover by reason of the absence of key ways the stock may be made lighter as compared to hub members that are interlocked by the use of a key, thereby effecting a stock saving in material without in any way sacrificing strength. Furthermore the interfitting parts will naturally or automatically find their proper interfitting engagement when the outer member is placed over the inner member, thereby avoiding the annoyance and time required to properly register opposing key ways in the parts where the keys are employed.

Another advantage of the construction described is that the application of the demountable feature of the hub does not in any way change or modify the hub construction so far as it relates to the application of the bearings thereto between the hub and the shaft or axle and consequently avoids the necessity of in any way changing or redesigning the bearings or the internal parts of the hub.

A further important advantage of the interlocking effect produced by the integral, complemental inter-locking parts of the tapered portions of the hub members is that the inter-fitting engagement of the said tapered portions may be maintained tight, and in accuracies of fit, due to wear or other reasons, may be taken up by forcing said tapered portions tightly one over the other. This close interfitting engagement of the parts can not be maintained where the parts are interlocked by a separately formed key or like means, engaging keyways in the members, inasmuch as there are no means to compensate for lateral wear on the key or on the side walls of the key ways, while wear of a keyed construction would soon result in a looseness of fit in the key and permit back lash of the parts, such as would necessitate the replacement of the key, which would need to be specially fitted to the worn key ways. Moreover in a keyed construction the entire stress which is transmitted from one member to the other member keyed thereto is taken wholly by the key, whereas in my improved interlocking connection the stress is transmitted at a plurality of points in the circumference of the members, or throughout such circumference when the oval or other similar cross sections are employed. Therefore the interlocked members produce a hub which is practically as strong as a solid hub of like dimensions.

An important practical advantage of the arrangement of the locking ring whereby it is interlocked with one of the hub members to rotate freely thereon, is that the wedging surfaces of the hub members are automatically separated when the locking ring is unscrewed to release the outer hub member. By reason of the close wedging engagement of the tapered parts of said members, they are likely to stick, and this is especially true if the engaging surfaces should become rusted. In the absence of the automatic separating function of the locking ring, it would be necessary to carry some special implement for separating or forcing the hub members apart after the locking ring is removed.

It will be observed that in the construction herein shown the locking ring, when loosened, is free to rotate relatively to the hub members, and that the outer hub member is free to slide outwardly on the tapered inner member so that the normally concentric locking ring and outer hub member become relatively eccentric. The axial displacement of the outer hub member on the inner member also permits lateral tipping of the outer wheel part on the inner member, due to side sway or the weight of the vehicle. Furthermore, such lateral displacement of the outer hub member permits slight relative rotation of the hub members in both directions.

The hub members coact with the locking ring, when the ring is loosened to automatically tighten it, and to force the hub members into interfitting concentric relation and the hub elements operate, when the ring is so tightened, with the same effect as a solid or integral hub.

In the operation of a vehicle equipped with my demountable wheel hub various forces are brought into action to automatically tighten the loosened locking ring. When driving over perfectly smooth roadways or operating under like ideal conditions the ring may be automatically tightened by a coöperative action of the hub members and ring based on the principle that when two solids of circular cross-section are assembled one within the other, and are rotated under conditions that hold them in contact along one side and substantially out of contact along the opposite side, the inner one, being of smaller diameter, will revolve faster and produce a differential action to tighten the ring, if the screw-thread be in the proper direction.

When driving over rough and uneven roadways it is thought that other forces are set up, due to road resistances, varying applications of motor power to the wheels and side tipping, produced by swaying or the weight of the vehicle, which supplements or replaces the first mentioned force to automatically tighten the locking ring. For instance, assuming that the hand of the screw-thread to tighten the ring is in the direction of forward rotation of the wheel, forward rotation of the outer hub member relatively to the inner hub member, when the ring is loosened, acts at the limits of the side tipping of the wheel with a forward clutch action to tighten the locking ring, while reverse relative rotation of the hub members is ineffective to further back off the ring, because acting against a direction of screw-thread which is ineffective to maintain clutching engagement between the ring and outer hub member. Again, with the same arrangement of the locking ring and hub members, a like tightening effect is produced with a screw-thread which runs in a direction opposite to the direction of rotation of the wheel, inasmuch as the ring is free from engagement with the outer hub member during the interval between the limits of side tipping of the outer wheel part, so that said ring tends to lag relatively to the positively driven wheel, with the result that the screw-threaded inner hub part is screwed into the lagging ring. Any tendency to loosen the ring due to clutch action between it and the outer hub member and relative rotation of the hub members is counteracted because the direction of the screw-thread is ineffective to maintain such clutching action. The tendency to tighten the ring, however, due to these factors is effective because running with the screw-thread and supplements the lagging action of the ring to tighten the same. It will thus be seen that the contact of the locking ring with the inner and outer hub members coöperate with forces generated by the eccentric relation of the hub members and the side tipping of the outer hub member on the inner hub member, due to varying road resistance to wheel travel and to varying application of power to the wheels, and also conditions which cause side tipping of the vehicle, to automatically tighten the locking ring, regardless of the hand of the screw thread on the ring and the hub member to which it is screw-threaded.

The invention is not limited to the structure illustrated for producing the interlocking connection between the hub members or for obtaining the eccentric relation between said members.

A further feature of importance in the construction shown resides in the relation of the tapered engagement of the inner and outer hub members relatively to the opposed tapers between the locking ring and the inner hub member, inasmuch as said opposed tapers make it practical to normally maintain the tapered surfaces in close wedging engagement to take up lost motion between the parts due to wear and to thereby normally hold the parts free from tendency to relative rotation or side tipping. It is apparent that the leverage of the wheel spokes impose an enormous stress on the engaging surfaces of the inner and outer hub members and locking ring which tend to wear said surfaces and loosen the parts. However, the opposing tapers render it possible to take up such lost motion and to maintain the inner and outer members normally free from relative rotation or tipping movement.

It will be observed that the hub herein shown follows a standard hub in dimensions and outlines so closely that the application of my improvements to the hub are scarcely perceptible when the hub is assembled.

I claim as my invention:

1. In a hub for a demountable wheel, an inner member and an outer member fitted one over the other, and provided with complemental, engaging surfaces, having cone-like contour and with means for locking the members, constructed to wedge the cone-like surfaces together, the complemental engaging surfaces embracing non-circular, circumferentially continuous and transversely complemental parts, whereby relative rotation of the members is prevented solely by contact of the said circumferentially continuous engaging parts.

2. In a hub for a demountable wheel, an inner member formed with a non-circular, circumferentially continuous cone-like periphery, an outer member fitted thereover and formed with an interior surface complemental to the periphery of the inner member, and a locking member screw-threaded to the inner member and bearing against the outer member to force the cone-like surfaces into wedging engagement.

3. In a hub for a demountable wheel, an inner member provided with an exterior taper, an outer member provided with an interior taper, complemental to and engaging said exterior taper, and means for locking said members together, constructed to wedge the tapered portions thereof, the complemental engaging portions of the members being of oval cross section to lock the members from relative rotation.

4. In a hub for a demountable wheel, an inner member formed with a non-circular, circumferentially continuous cone-like periphery, an outer member fitted thereover and formed with an interior surface complemental to the periphery of the inner member, a locking member screw-threaded to the inner member and bearing against the outer member to force the cone-like surfaces into wedging engagement, and means for effecting a swiveling connection of the locking ring with the outer member, whereby when the locking ring is turned away from the outer member it serves to withdraw the outer member from the inner member.

5. In a hub for a demountable wheel, the combination with an inner member of an outer member removably fitting said inner member, said outer member comprising a main body portion and end members for retaining the spokes of the wheel, the socket in said outer member being enlarged at its outer end, thereby providing a bearing surface within the interior of said outer member; a tubular locking device threaded upon the inner hub member, in the enlarged portion of said socket in engagement with said bearing surface and with the outer end of said locking device accessible for engagement by an operating tool.

6. In a hub for a demountable wheel, an inner hub member; an outer hub member removably fitted over said inner member, said outer hub member comprising a tubular portion and spoke flanges thereon, said tubular portion being cut away at its outer end to provide a bearing surface upon the interior of said outer hub member and an outwardly opening annular recess surrounded by the peripheral base of the front spoke flange; and a locking ring within said annular recess swiveled to said outer hub member in engagement with said interior bearing surface thereof and threaded upon said inner hub member, the outer end of said locking ring projecting forward of the front spoke flange and being provided with spanner holes, whereby said locking ring is adapted to be operated by a spanner wrench.

7. A hub for a demountable wheel comprising an inner member provided with an exterior taper and with a screw-thread, an outer member provided with an interior taper complemental to and engaging the exterior taper of the inner member and provided also at one end with an annular recess, a screw-threaded locking ring in said recess engaging the screw-thread of the inner member for wedging said tapered portions of the members together, said ring and the outer wall of the recess being provided with registering, annular grooves, and a split ring, contained part in one groove and part in the other for confining the ring in said recess.

8. In a hub for a demountable wheel, an inner member and an outer member fitted one over the other and provided with complemental interlocking parts adapted to be separated in demounting the wheel, the outer member being provided with spoke flanges and being recessed at the base of the front spoke flange, and a locking device for forcing said interlocking parts together, said locking device being housed in said recess and substantially flush with the outer contour of the hub at the base of the spoke flange.

9. In a demountable wheel, an inner hub member, an outer member removably fitted thereover, means limiting relative rotation of said members, a locking ring screw-threaded to one of the members and engaging the other member for retaining the outer hub member on the inner member, said ring and outer hub member being eccentrically disposed relatively to each other when the locking ring is loosened, and the locking ring when loosened being free to rotate, whereby the engaging surfaces of the ring and of the hub members coact to control the ring to automatically tighten the ring.

10. In a demountable wheel, an inner hub member, an outer hub member removably fitted thereover, with means limiting relative rotation thereof, a locking ring screw-threaded to one of said members and engaging the other member to lock the outer member on the inner member, said ring, when loosened, being free to rotate, and the ring and the inner and outer hub members having opposing tapers which serve when the ring is tightened to maintain the ring and hub members concentric and when loosened to permit relative eccentric disposition and side tipping of the ring and hub members whereby tightening forces are set up under conditions of use of the wheel hub to automatically tighten the ring.

11. A demountable wheel hub comprising permanent inner and removable outer hub members, with means limiting relative rotation thereof, a ring screw-threaded to the inner member and formed with an inwardly facing taper, the outer hub member having a complemental taper to engage the tapered surface of the ring, and the inner member being provided at its inner end with a taper to oppose the taper of the locking ring, and the outer member having a complemental taper to engage the taper of the inner hub member, said ring being free to rotate when loosened, and the engaging surfaces of the ring and hub member coacting to automatically tighten the ring.

12. In a demountable wheel hub, an inner hub member, an outer hub member fitted thereover, means limiting relative rotation of said members, a locking ring threaded on one of the hub members and having a portion overlapping the other hub member and in engagement therewith, said hub-members being provided with complemental engaging surfaces normally holding the hub-members concentric and upon loosening of the ring permitting eccentricity between said members, resulting in a transfer of load from one hub-member to the other through the ring.

13. In a demountable wheel, in an inner hub member, an outer hub member removably fitted thereover, interlocking connections to prevent substantial relative rotation of said members, a locking ring screw-threaded to one of said hub members and having an annular clutch surface to engage a complemental clutch surface on the other member to thereby constitute a locking ring tightening clutch between said latter hub member and the locking ring, and means to provide a limited relative, eccentric rotation between the hub members in both directions whereby, when said locking ring is backed off, relative eccentric rotation of said members actuates the clutch to tighten the locking ring.

14. In a demountable wheel, an inner hub member, an outer hub member removably fitted thereover, with interlocking connections between the hub members to prevent substantial relative rotation thereof, and adapted to be separated in axial direction to remove the wheel, and having limited capacity for relative rotation, and a locking ring screw-threaded to one hub member and acting against the other hub member to hold the hub members in assembled relation and capable of free relative rotation to both members when occupying its normal locking position, and clutch means on the ring and said latter hub member adapted to be actuated, when the locking ring backs away from said member against which it acts, by limited backward and forward relative rotation of the hub members, to tighten the locking ring.

15. In a demountable wheel, an inner hub member, an outer hub member removably fitted thereover, said members having complemental, non-circular cone-like engaging surfaces adapted to be separated in axial direction in demounting the wheel, and adapted, upon slight relative endwise displacement, to permit limited eccentric rotation of the members, a locking ring screwed to one member, and clutch means to maintain the locking ring tightened comprising a tapered portion on the other member and a complemental tapered portion on the locking ring for engagement therewith.

In testimony, that I claim the foregoing as my invention I affix my signature in the presence of two witnesses, this 21st day of February A. D. 1910.

THOMAS I. DUFFY.

Witnesses:
W. L. HALL,
WILLIAM GOLDBERGER.